United States Patent [19]

Hunter et al.

[11] 3,932,506

[45] Jan. 13, 1976

[54] RANEY COPPER CATALYST PRODUCTION AND USE

[75] Inventors: Wood Eugene Hunter, Lombard; Karl H. Hoffman, Brookfield, both of Ill.

[73] Assignee: Nalco Chemical Company, Chicago, Ill.

[22] Filed: Aug. 8, 1974

[21] Appl. No.: 495,567

[52] U.S. Cl.......... 260/561 N; 252/476; 252/477 Q; 260/557 R; 260/558 R
[51] Int. Cl.²...................................... C07C 103/08
[58] Field of Search........ 260/557 R, 558 R, 561 N; 252/463, 476, 477 Q

[56] References Cited
UNITED STATES PATENTS 3,767,706   10/1973   Habermann et al............ 260/561 N
3,809,658   5/1974   Csuros et al................... 252/477 Q

FOREIGN PATENTS OR APPLICATIONS 44-8987    4/1969   Japan
44-8988    4/1969   Japan............................. 252/477 Q
44-9459    5/1969   Japan............................. 252/477 Q
2,240,783  2/1973   Germany

*Primary Examiner*—C. Davis
*Attorney, Agent, or Firm*—Hill, Gross, Simpson, Van Santen, Steadman, Chiara & Simpson

[57] ABSTRACT

An improved technique for making a Raney copper catalyst by contacting particulate copper/aluminum alloy particles with an aqueous solution containing dissolved therein both alkali metal hydroxide and at least one polyfunctional oxygen-containing aromatic compound. The catalyst so prepared is used in the catalystic hydrolysis of acrylonitrile to acrylamide.

21 Claims, No Drawings

RANEY COPPER CATALYST PRODUCTION AND USE

BACKGROUND OF THE INVENTION

Raney copper catalysts are conventionally prepared by contacting a starting copper aluminum alloy in particulate form with aqueous alkali metal hydroxide to remove some portion of the aluminum present initially. The manner in which such contacting is conducted affects the properties of the resulting Raney copper catalyst in such reactions, for example, as the hydrolysis of acrylonitrile to acrylamide under aqueous liquid phase conditions conducted in the presence of such catalyst.

Apparently, Raney copper catalysts have heretofore always been prepared with attention being given primarily to aluminum removal. Apparently, complete aluminum removal was heretofore sometimes believed to have been achieved and to be desirable for purposes of enhancing catalyst activity for this nitrile hydrolysis reaction; see, for example, Canadian Pat. No. 899,380, at p.5 where the Kawaken Fine Chemicals Co. Raney copper catalyst is used. According to Kawaken Fine Chemicals Co. trade literature, it appears that substantially complete aluminum removal is achieved in such catalyst.

The art theorizes that Raney catalysts can contain amounts of insoluble aluminates which are sufficient to adversely affect catalyst activity and life for whatever reason, and the art has described processing procedures alleged to remove such impurities; see for example, U.S. Pat. Nos. 2,643,189; 2,604,455; 2,950,260; and British Pat. Nos. 642,861 and 658,863.

It has heretofore been proposed to activate Raney alloys for use as fuel cell electrodes by using in the activating solution alkali metal tartrates of polycarboxylated aliphatic amino compounds; see U.S. Pat. No. 3,235,513. See also U.S. Pat. No. 3,067,276 for a discussion of catalyst regeneration using citric acid.

Because of the limitations and shortcomings observed for prior art Raney copper catalysts as respects catalyst initial activity and catalyst life, the art continues to seek improved Raney copper catalysts such as will be particularly suitable for use in such a nitrile hydrolysis reaction operated, for example, at rapid conversion rates and high conversion levels using a concentrated acrylonitrile/water feed.

So far as is known, no one has ever heretofore used, or suggested the use of polyfunctional oxygen-containing aromatic compound in preparing a Raney copper catalyst with aqueous alkali metal hydroxide. Furthermore, so far as is known, no one has ever heretofore used such a catalyst for the catalytic hydrolysis of acrylonitrile to acrylamide under aqueous liquid phase conditions.

BRIEF SUMMARY OF THE INVENTION

The present invention is directed to an improved process for preparing a Raney copper catalyst and to the resulting catalyst so prepared. The process involves contacting particles of a metal alloy comprised of copper and aluminum with an aqueous solution which has dissolved therein on a 100 weight percent total by-product free solution basis from greater than 0 to about 25 weight percent of a material selected from the group consisting of alkali metal hydroxide preferred and amine base and from greater than 0 to about 25 weight percent of at least one additive as herein described. The contacting is conducted at a temperature which is below about 80°C.

The present invention is further directed to an improved process for making an olefinic amide such as acrylamide from a starting composition comprising an olefinic nitrile, such as acrylonitrile and water by catalytic hydrolysis using the catalyst prepared according to the teachings of this invention. Typically, such a starting composition comprises from about 10 to 75 weight percent olefinic nitrile with the remainder up to 100 weight percent thereof being water. Preferably, such starting composition contains from about 30 to 40 weight percent olefinic nitrile (same basis). The process is conducted under aqueous liquid phase conditions using temperatures in the range of from about 150° to 300°F, with temperatures in the range of from about 160° to 250°F being presently preferred. The olefinic nitrile preferably contains from 3 through 6 carbon atoms per molecule.

The additives used in the present invention are polyfunctional oxygen-containing aromatic compounds containing at least six carbon atoms per molecule. In addition, each molecule contains at least two oxygen atoms. The oxygen atoms are preferably each incorporated into either a hydroxyl group or a carboxyl group. One or more aldehyde groups may be present in a molecule particularly if such groups are hydrolyzable when such molecule is in aqueous alkaline solution. At least one of such oxygen containing groups is substituted on an aromatic nucleus in each molecule. In one class of such compounds, at least two such groups are both substituted on an aromatic ring in each molecule. In another class of such compounds, only at least one such group need be substituted on an aromatic ring, but at least two such groups are then also substituted on an alkyl side chain which chain is directly substituted on an aromatic ring in each molecule. Preferably, each molecule contains a total of at least three such oxygen containing groups. A carboxyl group may be in the acid form or in a salt form (when the latter, the salt is preferably either formed with an alkali metal hydroxide or ammonium). Each such compound is soluble in water at a pH greater than 10 to an extent such that about a 5 weight percent solution thereof can be formed at room temperature conditions. At least one oxygen atom in a given molecule can be a member of a heterocyclic ring, in which event the heterocyclic oxygen containing ring is substituted by at least one carboxyl group. Each such compound has a molecular weight of not more than about 1,000, and preferably not more than about 600, and, if a repeating or condensed group of molecules is involved in a single larger molecule, no compound is more than a dimer or a trimer. Such a compound is preferably substituted by at least one hydroxyl group and may contain as many as five or six hydroxyl groups. Such a compound can preferably include at least one six-membered aromatic ring and may contain as many as three such rings. Also, such a compound preferably does not contain more than six oxygen atoms and not more than four carboxyl groups.

One preferred class of such compounds comprises hydroxylated benzoic acids containing from 1 through 5 hydroxyl groups per molecule.

The catalyst so prepared characteristically and typically comprises from about 2 to 45 weight percent aluminum with the balance up to 100 weight percent being copper in any given catalyst. Minor quantities of other materials, such as oxygen, may be present. More preferably, such catalyst comprises, on a 100 weight percent total weight basis, from about 10 to 35 weight percent aluminum with the balance up to 100 weight percent thereof being copper. This catalyst characteristically and typically has an average particle size (diameter) in the range from about 0.001 to 0.5 inch, though larger and smaller particle sizes may be used if desired.

Because of the characteristically high initial catalytic activity, and also the characteristically long catalyst activity life, particularly in the aqueous liquid phase catalytic hydrolysis of acrylonitrile to acrylamide, associated with the type of catalyst so prepared by the process of this invention, the present invention provides an improved catalyst which may be used under conditions of continuous and extended use to produce desired, economically significant, high conversion yields of a product, such as acrylamide from acrylonitrile by hydrolysis.

In addition, the process of this invention offers operating efficiencies and economies, particularly in fixed catalyst bed reactors adapted for continuous operation, which are believed to be greater than heretofore known in the art of Raney copper catalysts.

The invention further provides an improved process for hydrolyzing acrylonitrile to acrylamide using the Raney copper type catalyst prepared as taught herein.

Other and further aims, objects, purposes, advantages, utilities, and features will be apparent to those skilled in the art from a reading of the present specification.

DETAILED DESCRIPTION

The catalyst of the present invention is a Raney copper type catalyst which has been activated through contact with an aqueous composition containing therein both dissolved base (e.g., alkali metal hydroxide, ammonium hydroxide, and/or amine base) and dissolved additive. The starting material is a preformed binary metal alloy comprised of aluminum and copper in particulate form which contains a weight ratio of Al/Cu in the range from about 70:30 to 30:70 (preferably about 45:55 to 55:45, and most preferably about 50:50). Minor quantities of other materials, such as metals or oxygen, may be present in a starting alloy.

In general, no particular special conditions need be employed when contacting starting alloy particles with an aqueous solution of base and additive. Typically, the alloy starting material is, as indicated, in the form of particles ranging in size from about 0.001 to 0.5 inch. Preferably, this solution comprises from greater than 0 to about 5 weight percent additive from greater than 0 to about 15 weight base (alkali metal hydroxide and/or amine base) and with the balance up to 100 weight percent thereof being water (total by-product free composition basis). More preferably, such a solution comprises from greater than 0 to about 10 percent alkali metal hydroxide, from about 0.01 to about 1.0 weight percent additive and with the balance up to 100 weight percent thereof (total by-product free composition basis) being water, though some aluminate may be present with other by-products. Preferably, the process of contacting with such a solution is conducted while maintaining the reaction zone in the region of the particles being activated into Raney copper catalyst at a temperature in the range of from about 0° to 80°C. Preferably, the contacting time ranges from about ½ to 30 hours, though larger and shorter times may be employed if desired as those skilled in the art will appreciate. More preferably, the contacting temperature is in the range of from about 30° to 60°C. More preferably, the contacting time is adjusted to be in the range of from about 4 to 12 hours.

While the solution concentration of, respectively, base and additive can vary over very wide ranges, no particular advantage is normally attributed to a particular set of concentration values. The exact amount of additive and base, respectively, used in a given catalyst activation performed in accord with the teachings of this invention can vary over relatively wide ranges, as indicated. When a catalyst activation procedure using a particular additive material is being optimized so as to produce, for example, a catalyst having maximized initial activity, it can be borne in mind that apparently each additive has its own particular optimized concentration level. Above such level further increases thereof may result in no substantial further increase in product catalyst activity and/or life in a given catalyst activation solution used in accord with the teachings of this invention. Indeed, at relatively high concentrations, at least some additive materials may cause side reactions or other (presently unknown) effects to occur which exert an adverse influence upon a given activation procedure. Thus, as those skilled in the art will appreciate, it is practically impossible to express for each additive a broad useable range or an optimized use range. In general, lower as opposed to higher concentrations of an additive material are preferred for reasons of economy and general effectiveness in commercial activation procedures.

A copper catalyst prepared according to this invention preferably should have at least about 25 weight percent of the initially present aluminum in such alloy particles removed during base contacting; however, it is apparently not necessary to remove aluminum from a catalyst during activation thereof by contacting such with a mixed solution of, for example, alkali metal hydroxide and additive, as taught by this invention.

In one preferred and exemplary plant operational mode of catalyst preparation, activation of such starting alloy is accomplished by first contacting an aqueous solution of at least one additive with a group of such alloy particles. This aqueous solution can contain dissolved therein from about 0.01 to 1.0 weight percent of additive (total solution basis). Conveniently, the particles are preferably initially immersed in water and the additive(s) is (are) added to such water of immersion until the desired concentration of such compound(s) is (are) obtained. Such alloy particle group has an average particle size (diameter) in the range from about 0.001 to 0.5 inch, and such copper alloy preferably has a copper to aluminum weight ratio of from about 45:55 to 55:45. This aqueous solution has a temperature in the range from about 30° to 60°C during contacting. The time of such first contacting is relatively unimportant, though times of from about 5 minutes up to several hours have been found to be convenient.

Secondly, one contacts the resulting said group of alloy particles with an aqueous alkali metal hydroxide (preferred) or amine base solution. Conveniently, the alkali metal hydroxide or amine base is added to (and dissolved in) the previously utilized solution of additive while continuous contact of such solution with such particles is maintained. Such second contacting is accomplished over a total time interval of from about ½ to 30 hours, and such fresh base solution is added gradually to such contacting solution over said time interval. The contact rate or addition rate of caustic being added to said group of particles and such contacting solution during such contacting typically ranges from about 0.01 to 10 pounds base (alkali metal hydroxide or amine base) per pound of said starting group of alloy particles per hour. The total quantity of base so added to the aqueous medium in the reaction zone is typically in the range of from about 0.5 to 25 pounds of base per pound of said group of particles (dry weight basis). During such contacting, such aqueous base solution and the resulting aqueous medium produced in such contacting each have a temperature in the range from about 0° to 80°C. During such second contacting, said group of particles is thus maintained in contact with at least one additive. Preferably at least about 25 weight percent (total starting weight basis) of this aluminum initially present is removed during such a contacting operation conducted in accord with the teachings of this invention during the course of such an initial catalyst operation using fresh starting alloy particles.

While some base during the contacting characteristically reacts with the aluminum of the alloy particles, the manner in which an additive functions in the practice of the present invention is presently unknown. One theory (and there is no intent herein to be bound by theory) is that such additive functions as a sequestering or stabilizing agent which prevents the precipitation of solid particles of alumina (or derivitives) on the surface or in the pores of the catalyst, a theory which may be supported by U.S. Pat. No. 2,345,134 where polyhydroxylated compounds apparently act as stabilizing agents for sodium aluminate.

After such contacting, the resulting grouping of Raney copper catalyst particles is preferably washed to separate therefrom remaining additive, the remaining unreacted base, aluminate or other by-products. Thereafter, the so-washed group of particles may optionally interveningly be stored before being used in a subsequent catalytic process.

Examples of suitable additives include resorcinal, salicylic acid, pyrogallol, pyro-mellitic acid, 4-pyragallol carboxylic acid, pyrogallol-1, 2-dimethyl ether, pyrogallol-2-methyl ether, pyrocatechol, pyrocatechol o-acid, pyrogallol triacetate, pyromucic carboxylic acid, furan-2, 5-dicarboxylic acid, pyro-tritaric acid, p-phthalic acid, terephthalic acid, isophthalic acid, phthalide, hydroquinone, gentisic acid, hydroxy methyl benzoic acid, coumarone-2-carboxylic acid, 2-hydroxy methyl furan, furfural, gallic acid, phloroglucinol, phloroglucinol carboxylic acid, phloroglucinol dimethyl ether, hydronapthoquinone, 2, 5-dihydroxyterephthalic acid, 3-hydroxy-hydrocinnamic acid, 1,2,5-trihydroxy-anthraquinone, 2,3,4-trihydroxybenzo-phenone, quinic acid, 2,3,4,5-tetrahydroxy benzoic acid, 1,2,5,6-tetrahydroxy anthraquinone, paraconic acid, and the like.

Those skilled in the art will readily appreciate that any convenient procedure or technique may be employed for contacting starting copper/aluminum alloy particles with an aqueous mixture of base and additive. The starting alloy particles can be added to a starting mixture composition, or vice versa, or otherwise as desired. While pretreatment of particles of alloy with a starting mixture comprising an aqueous solution of compound of additive is more convenient, such is not necessary.

A preformed Raney copper catalyst conventionally prepared by base contact can be post-treated, if desired, with a starting solution comprised of base (preferably alkali metal hydroxide) and additive in accord with the teachings of this invention, particularly when optimized catalyst performance is not needed. It is preferred to activate a catalyst as taught herein for use in this invention under conditions such that the metal particles are subjected to a minimum of heat exposure, such as is generated when, for example, concentrated aqueous alkali metal hydroxide contacts the starting alloy particles. It is preferred to activate a catalyst as taught herein for use in this invention using temperatures which do not exceed about 80°C and by using controlled incremental or continuous addition of base solution over an extended time period to an aqueous medium being used to activate a group of particles. In the practice of this invention, activation of a Raney copper catalyst may be accomplished using very dilute aqueous solutions of alkali metal hydroxide. Even trace amounts of a base such as alkali metal hydroxide have been found to be suitable for activation, as have trace amounts of additive. In general, it is preferred to practice this invention using small amounts of less than about 1 weight percent total solution basis of, respectively, base and additive.

It is preferred to remove at least about 25 weight percent of the aluminum initially present in starting particles during a contacting operation with aqueous base solution in the preparation of a catalyst of this invention made from starting copper/aluminum alloy particles as herein described, whether or not the base solution contacting is carried out in whole or in part, or even not at all in the presence of additive (though in this last situation a base treated group of particles is post treated with an additive solution, as indicated, in accord with this invention). Preferably additive and base are simultaneously present in a treating operation.

For reasons not altogether presently clear, it appears that it is not practical in base solution contacting to remove all of the aluminum present in particles. Commonly, with larger sizes of product particles about 15 to 20 weight percent of aluminum may be present total initial catalyst basis. Such a quantity of residual aluminum present in product catalyst particles does not appear to adversely affect catalyst properties.

With certain types of base solution a more vigorous rate of reaction between the particles and solution can occur than with others during contacting as demonstrated, for example, by the rate of hydrogen evolution. For example, alkali metal hydroxide at solution strengths from about 5 to 30 weight percent can cause a vigorous reaction to occur even at ambient temperatures. In general, the contacting may be, and preferably is accomplished under conditions of controlled reaction rate between particles and solution.

Typically one can employ during catalyst activation a total quantity of aqueous base, such that the molar quantity of hydroxide used totals from about 0.25 to 2.0 times (preferably 1.1 to 2.0 times) the total molar amount of aluminum initially present in a starting group of alloy particles, as when a batch preparation procedure is being employed, where the aqueous base is being added to a vessel containing a fixed quantity of starting alloy with aqueous additive and the aqueous base leaching composition being allowed to accumulate in this vessel during the leaching operation. The amount of hydrogen gas evolved during an activation or a contacting in accord with this invention is not always related to, or correlated with, the amount of base actually used.

The reaction rate is monitorable by metering the rate of hydrogen evolution.

Incremental addition of base solution can also be used to regulate reaction rate between base solution and starting alloy particles. One may also employ temperature regulation as a primary means of controlling production of catalyst from a starting alloy. In general, for higher concentrations of base, it is preferred to use lower contacting temperatures, although more strongly basic materials tend to react more rapidly than weaker basic materials at equivalent concentrations.

For example, when so using temperature control, those skilled in the art will appreciate that the contacting solution may initially contain at least about 0.1 weight percent of dissolved material selected from the group consisting of alkali metal hydroxide, ammonium hydroxide, aliphatic amine and/or quaternary ammonium hydroxide and preferably about at least 15 weight percent thereof. Optionally, substantially all of the contacting solution can be initially present in a contacting medium and such medium is conveniently bulk added to a reaction zone wherein the alloy particles are maintained and the bulk temperature is maintained below about 80°C during such contacting until preferably at least about 25 weight percent, and more preferably at least about 50 weight percent of aluminum is removed (based on total initial alloy weight).

When using temperature control, it is preferred, for example, to use temperatures below about 30°C when alkali metal hydroxide concentrations greater than about 5 weight percent are employed in the contacting solution.

A group of starting alloy particles may have been previously processed by some technique known to the prior art. For example, a previously prepared Raney copper catalyst may be apparently typically improved as respects catalyst nitrile activity or life in use in the hydrolysis of acrylonitrile to acrylamide as taught herein by contacting with solutions in accord with the teachings of this invention.

Preferred nitrogen bases for use in this invention comprise ammonium hydroxides, alkyl amines, alkanol amines, and quanternary ammonium hydroxides. Preferred organic amine bases used in a second contacting operation in accord with the teachings of this invention comprise at least one compound selected from the group consisting of tri (lower alkyl) amines, tri (lower alkanol) amines, mono (lower alkyl) di (lower alkanol) amines, di (lower alkyl), mono (lower alkanol) amines, tetra (lower alkyl) quaternary ammonium hydroxides, tetra (lower alkanol) ammonium hydroxides, mono (lower alkyl) tri (lower alkanol) quaternary ammonium hydroxides, di(lower alkyl) di(lower alkanol) quaternary ammonium hydroxides and tri(lower alkyl) mono(lower alkanol) quaternary ammonium hydroxides. As used herein, the term "lower" has reference to less than six carbon atoms per group or molecule, as the case may be.

A suitable class of quaternary ammonium hydroxide compounds adapted for use in the present invention is characterized by the formula:

(1) 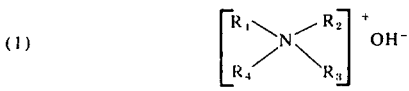

wherein; $R_1$, $R_2$, $R_3$, and $R_4$ are each a lower alkyl radical or a lower hydroxyalkyl radical.

When using an amine base, for example, the reaction rate between base and alloy particles is dependent upon many variables, such as amine base type, concentration, temperature, pressure, alloy particle size, alloy composition, and the like, as those skilled in the art will appreciate. Typically, a total quantity of amine base is used such that the molar quantity of amine base totals from about 0.25 to 2.0 times (preferably about 1.1 to 2.0 times) the total molar amount of aluminum initially present in a starting group of alloy particles as when a batch preparation procedure is being employed where the aqueous amine base is being added to a vessel containing a fixed quantity of starting alloy particles, and the aqueous amine composition is allowed to accumulate in the vessel during the activation operation.

Examples of suitable primary amines include methylamine, ethylamine, ethanolamine, and the like. Examples of suitable secondary amines include diethylamine, dimethylamine, diethanolamine, methyl ethyl amine, methyl ethanol amine, and the like. Examples of suitable tertiary amines include trimethylamine, triethylamine, triethanalamine, monomethyl diethylamine, dimethyl monoethanolamine, and the like. Examples of suitable quaternary ammonium compounds include tetra methyl ammonium hydroxide, tetraethyl ammonium hydroxide, methyl triethyl ammonium hydroxide, trimethyl monoethyl ammonium hydroxide, methyl ethyl n-propyl n-butyl ammonium hydroxide, mono methanol tri ethyl ammonium hydroxide, tetramethanol ammonium hydroxide, tetra ethanol ammonium hydroxide, and the like.

Various condensates of ethylene oxide, propylene oxide and/or butylene oxide with primary, secondary and tertiary amines can be employed. In general, commercially available materials are preferred for reasons of availability and cost. Mixtures of amine bases may be employed, such as a mixture of from about 25:75 to 75:25 weight ratio of tertiary (lower alkyl) amine with tetra (lower alkyl) ammonium hydroxide.

Further examples of monoamines include alpha-naphthylamine, beta-naphthylamine, m-anisidine, o-toluidine, o-anisidine, aniline, N-methyl-o-toluidine, m-toluidine, N-methyl-aniline, N-methyl-m-toluidine, p-toluidine, pyridine, N-dimethyl-aniline, p-anisidine, N-methyl-p-toluidine, beta-picoline, N-dimethyl-o-toluidine, alpha-picoline, gamma-picoline, triethanol-amine, tris (hydroxyethyl) methylamine, morpholine, diethanolamine, 2-methoxy ethylamine, ethanolamine, benzylamine, 1-propyl piperidine, 1-2 dimethyl piperidine, 1-ethyl piperidine, iso-butyl amine, 1-butyl piperidine, propylamine, iso-amylamine, n-butyl amine, iso-propylamine, cyclohexylamine, methylamine, ethylamine, triethyl-amine, dimethylamine, diethylamine, and piperidine.

Further examples of diamines include penta methylene diamine, tetra methylene diamine, trimethylene diamine, ethyl ethylene diamine, N-N' diethyl ethylene diamine, methyl ethylene diamine, N-N' dimethyl ethylene diamine, ethylene diamine, N-N diethyl ethylene diamine, hydroxyethyl ethylene diamine, piperazine, 1-2 diamino propane, 1-3 diamino 2-propanol, and N-N dimethyl ethylene diamine.

Examples of polyamines include diethylene triamine, 1-2-3 triamino propane, and triethylene tetramine.

It is preferred to conduct the activation operation under a blanket of nitrogen gas or a gas of the helium family, primarily to avoid forming explosive mixtures of hydrogen and oxygen.

At the end of a contacting operation by the teachings of this invention, the resulting solid catalyst particles remaining are preferably washed with water preferably to a neutral catalyst wash water pH (e.g., a pH not greater than about 9 and preferably less than about 8). The product catalyst is then removed from the reaction zone, and wet screened to separate fines, preferably. The wash water may be preferably deionized or distilled. Any conventional washing procedure may be employed.

The product catalyst is conveniently stored under water, as in drums, prior to charging to a reactor for use in the practice of the process of the present invention. Keeping the catalyst under water prevents oxidation by air which occurs rapidly if the catalyst is allowed to have oxygen exposure.

When practicing the process of the present invention to make a Raney copper catalyst for use in a suspension reactor bed system, it is preferred to employ the Raney copper catalyst in the form of particles at least 90 weight percent of which are in an average size range from about 0.002 to 0.100 inch. Similarly, when the present invention is used to make a Raney copper catalyst for use in a fixed bed system, it is convenient and preferred to use the Raney copper catalyst in the form of particles at least 90 weight percent of which range is average size from about 0.02 to 0.50 inch.

In one more preferred catalyst preparation procedure, using the preferred route above-described, the said group of alloy particles is confined to a reaction zone. A base solution and a solution of additive may be admixed and contacted with said group of particles in said zone, but the resulting aqueous medium is gradually removed from the zone during the contacting. In another more preferred catalyst preparation procedure, using the preferred route above-described, the said resulting aqueous medium is so removed at a volumetric rate which is about equal to the rate of addition of said base solution. In such a removal procedure, substantially 100 weight percent of this so-removed resulting aqueous medium can be recycled back into contact with the group of particles being activated. During such a recycle, the sorecycled aqueous medium is admixed with at least a portion of fresh base solution before or during recycle contact with such a group of particles.

Alternatively, less than 100 weight percent of said soremoved resulting aqueous medium can be recycled back into contact with said group of particles. The balance up to 100 weight percent thereof of such soremoved medium is permanently removed from said reaction zone and can be discarded. Base may be added to such reaction zone at a rate approximately equal to the rate at which base is consumed through reaction with the aluminum in the alloy. The contacting process involving base addition may preferably be practiced continuously at a rate which is approximately equal to the rate of base consumption. The amount of aluminum left in the catalyst after an activation, as described herein, can vary widely, but in the case of an active catalyst used for fixed bed catalysts, it has been found that as much as 20 weight percent aluminum (based on total catalyst weight) can be present in a catalyst without apparently affecting catalyst use and performance characteristics, such as conversion rate, throughput rate of reactants, catalyst life, catalyst activity, etc., a fact which is somewhat surprising in view of the prior art above-reviewed. Additive can be added with base.

In preparing a catalyst of this invention, it will be appreciated that there apparently is a sensitive relationship between the temperature of activation and the time of base contact with starting alloy. In general, the higher the temperature, the longer should be the time for base addition to provide a most active catalyst, because under such conditions localized overheating of the catalyst particles is avoided or reduced to a minimum level. Localized overheating of alloy particles may interfere with generation of a catalyst having an optimum desired group of characteristics associated therewith. If one employs a rapid reaction between alloy particles and base, there seems to be a tendency to cause a lessening of catalyst activity. A surprising amount of heat can be liberated when one contacts alloy particles with base solution so that on a large scale of catalyst activation, refrigeration equipment could be used to remove the exotherm.

Preferably the starting alloy particles are maintained under water (to avoid oxygen exposure) and preferably prior to (and during) contacting with base solution the particles are in the presence of an aqueous solution of one or more of the additives. Mixtures of different additives may be employed. Preferably such a pre-contacting solution contains from greater than 0 up to about 5 weight percent of a polyfunctional oxygen-containing aromatic compound (more preferably from about 0.01 to 1.0 weight percent) with the balance up to 100 weight percent on a total composition basis being water.

The liquid phase hydrolysis of this invention proceeds even when the amount of the catalyst (prepared as described herein) employed is very slight. For example, addition of a catalyst as taught by this invention in an amount from about 0.1 gram per mole of olefinic nitrile is sufficient to make the reaction proceed. The greater the amount of catalyst used, the faster the reaction proceeds, in general, thus permitting an increase in the amount of olefinic amide produced. Consequently the amount of catalyst employed per mole of olefinic nitrile initially employed can preferably range from about 0.01 to 100 grams, although more or less catalyst can be used, if desired.

Acrylamide, for example, may be made from a mixture of acrylonitrile and water, as can other amides from their corresponding olefinic nitriles when admixed with water in accordance with the teachings of the present invention, using a suspension bed or a fixed bed of such catalysts. Combinations thereof may be employed. Two or more reactors may be connected in a series, and the reactant liquid and the catalyst may be counter currently moved relative to each other to effect and enhance reaction.

The hydrolysis process is preferably conducted under pressures sufficient to maintain liquid phase reaction conditions. Nitrile partial pressure in a reaction system can influence selection of optimized pressures. Batch processing may be used but continuous is preferred.

With the hydrolysis process of the present invention using a copper catalyst prepared as described herein and utilizing a suspension bed system, it is preferred to employ the catalyst in the form of particles at least 98 percent of which are in an average size range of from about 0.002 to 0.1 inch. Similarly, when the present invention is practiced using a Raney copper catalyst in the form of a fixed bed system, it is preferred and convenient to use the catalyst in the form of particles at least 98 percent of which range in average size from about 0.02 to 0.5 inch.

Those skilled in the art will appreciate that a catalyst prepared as taught herein may be subjected to further preparation by procedures known to the prior art, if desired, and before being utilized in the hydrolysis process as taught herein.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE I (Parts a through b)

A series of 2 different Raney copper catalysts are prepared using the following standardized procedure.

A 3 liter reaction flask is provided with a nitrogen purge inlet, a buret for caustic addition, a thermometer, and a hydrogen outlet connected to a wet test meter. A basket is attached to a motor-driven agitator shaft so that the basket can be rotated inside the reaction flask during the activation procedure.

A total of 200 grams of a copper/aluminum alloy particles are placed inside of the basket. The particles are between 6 and 8 Tyler mesh in size, and they are approximately 50% aluminum and 50% copper on a weight percentage basis. A total of approximately 2650 grams of deionized water and a preselected amount of an organic additive are charged to the flask. The flask is subsequently closed and purged with nitrogen to prevent forming an explosive gas mixture during activation. A total of 662 grams of a 50% by weight solution of sodium hydroxide in water are added to the flask incrementally over approximately a four hour period. After completing the sodium hydroxide addition, the mixture is held for an additional time period sufficient to allow a total of 4.2 to 4.7 cubic feet of hydrogen to evolve from the flask, as measured by the wet test meter. During the sodium hydroxide addition and the subsequent hold period the temperature of the liquid is maintained between 40° and 43°C. The basket containing the metal particles is rotated inside the liquid during the sodium hydroxide addition and subsequent hold period. After completing the activation procedure, the resulting Raney copper catalyst particles are washed repeatedly with water until the washings show a pH which is less than eight. Fines are removed by wet screening on a 10 Tyler mesh screen and subsequently are stored under water prior to testing for acrylonitrile hydration activity.

The additive tested is (a) 3,4,5, trihydroxybenzoic acid. A blank or control test (designated b) is run in which no additive is added to the catalyst reaction vessel. The results are summarized in Table 1.

The catalysts with additives prepared in Example 1 are each tested for acrylonitrile hydration activity by using the following standardized procedure:

A total of 80.6 grams of wet catalyst are charged to a reaction tube which has been fabricated from ¾ inch diameter pipe. The reaction tube is immersed in a hot water bath which is used to control temperature inside the tube, as measured by thermocouples which are enclosed inside of a thermowell which projects into the reaction tube from one end.

When this reactor is used to determine activity of a catalyst, acrylonitrile and water are separately pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected and analyzed by gas chromatography for weight % acrylamide, acrylonitrile, and water. From this analysis the percent conversion of acrylonitrile to acrylamide is estimated.

For each catalyst, a series of different tests are run at different contact times with all other variables held constant, as follows:
1. Arithmetic means catalyst bed temperatures of approximately 175°F.
2. Feed composition 100% basis of 25 weight % acrylonitrile and 75 weight % water.

Contact time is inversely measured as weight hourly space velocity (WHSV), which is defined as weight hourly feed rate divided by dry catalyst weight in the reaction zone.

The contact times are varied to bracket a 35% conversion of acrylonitrile to acrylamide. The WHSV required for a 35% conversion is estimated by graphical or statistical interpolation. The catalyst activity (a) is then calculated from the following expression:

$$a = 1.2 \, (WHSV_{35})$$

where $WHSV_{35}$ is the weight hourly space velocity required for 35% conversion of acrylonitrile to acrylamide.

The activities determined by the preceding procedure for the catalysts prepared in Example 1 are tabulated in Table 1. The catalyst (a) which was prepared using additive shows higher catalyst activity than the control test (b).

TABLE I

| Additive | Additive Level (% based alloy charge) | Additive Concentration in Solution* (% by weight) | Catalyst Activity |
|---|---|---|---|
| (a) 3,4,5 trihydroxy-benzoic acid | 5.0 | 0.3 | 9.1 |
| (b) control no additive | 0 | 0 | 3.2 |

*after completing sodium hydroxide addition, on an aluminate-free basis.

EXAMPLE 2

84 grams of 50:50 weight ratio copper/aluminum alloy in the form of particles of 6 to 8 mesh size are contacted with 500 grams of total of a 25 weight percent aqueous solution of trimethylamine in deionized water over a 48-hour period in a flask. The particles are initially covered by deionized water (about 500 ml) to which 4 grams of 3,4,5-trihydroxy benzoic acid has been previously added. The trimethylamine solution is introduced into the flask gradually at a rate such that the temperature of the agitated liquid reaction medium does not exceed about 40°C. Hydrogen gas is evolved.

The resulting particles are washed with fresh deionized water until the resulting pH is 7.5.

EXAMPLE 3

84 grams of 50:50 weight ratio copper/aluminum alloy in the form of particles of 6 to 8 mesh size are contacted with 1200 grams of a 15 weight percent aqueous solution of tetramethyl ammonium hydroxide in deionized water over a 24-hour period. The particles are initially covered with deionized water which contains 4 grams of 3,4,5-trihydroxybenzoic acid. The tetramethyl ammonium hydroxide is introduced into the flask gradually at a rate such that the temperature of the agitated liquid reaction medium does not exceed about 35°C. Initially, it was necessary to cool the system as evolution of hydrogen gas was quite vigorous.

The resulting particles are washed with fresh deionized water until the resulting pH is 7.5.

EXAMPLE 4

Choline Preparation

To a two-liter autoclave is charged 944 grams of a 25 weight percent solution of trimethylamine in deionized water. To this system under autogeneous pressure is charged gradually a stoichiometric quantity of ethylene oxide below the water level in the vessel at such a rate that the temperature of the liquid phase of the reactants in the vessel is maintained at less than about 40°C, during the exothermic reaction. Thereafter, after one hour of agitation, the resulting solution of choline so prepared is removed from the autoclave and placed in a storage flask.

This choline preparation is repeated until about 7500 grams of a 20 percent aqueous choline solution is prepared (with dilution by deionized water). This product solution contains minor amounts of ethylene glycol and trimethylamine.

Catalyst Activation 500 grams of 50:50 weight ratio copper/aluminum alloy in the form of particles of 6 to 8 mesh size are initially immersed in deionized water containing 50 grams of 3,4,5-trihydroxybenzoic acid. 7500 grams of the above prepared choline solution are gradually added to the liquid phase reaction zone. Agitation in the zone is generally insufficient to disturb the particles at the bottom the the reaction flask, and the choline solution addition rate being such that the reaction zone temperature does not rise above about 35°C. During this addition, hydrogen gas is evolved which is vented to the atmosphere. The addition of choline solution is accomplished over an interval of from about 2⅓ to 3 days. This solution is added during daylight hours at about 30-minute intervals. In the afternoon of the third day after the solution addition is complete, the agitation is stopped, the reaction mixture allowed to settle, and the liquid reactants are decanted. The resulting catalyst particles are washed with fresh, deionized water to a pH of about 7.5, after which they are stored under fresh deionized water.

EXAMPLE 5

The procedure of Example 3 is repeated except that in place of trimethylamine, mono ethylamine is employed using a 72 hour contact period.

EXAMPLE 6

The procedure of Example 3 is repeated except that in place of trimethylamine, a 10 weight percent ammonium hydroxide solution in deionized water is employed using a 72-hour contacting period.

EXAMPLE 7

A catalyst first is prepared in the same manner as described in Example 1 but, without adding any additive to the reaction flask prior to or during the sodium hydroxide addition.

Then this catalyst is treated as follows: A clean reaction flask as described and equipped in Example 1 is filled with approximately 2650 grams of deionized water, 662 grams of a 50 percent aqueous sodium hydroxide solution, and 10 grams of 3,4,5-trihydroxybenzoic acid. The previously prepared Raney copper type catalyst is charged into the basket which is immersed into this resulting solution and the basket is rotated in the solution for 3⅓ hours. The liquid temperature is held between 40° and 43°C. Less than 0.2 cubic feet of hydrogen is evolved, as measured by a wet test meter.

The catalyst so prepared when tested by the procedure of Example 2 is found to have an activity greater than about 3.2.

EXAMPLE 8

The catalyst produced in Example 1C is charged to the reaction tube of Example 2. The catalyst activity is evaluated in the manner described in Example 2 with the exception that methacrylonitrile is substituted for acrylonitrile. The catalyst is found to have significant activity for converting methacrylonitrile to methacrylamide.

We claim:

1. In an improved process for preparing a Raney copper type catalyst, the steps comprising contacting at a temperature below about 80°C particles of an alloy comprised of an alloy comprised of aluminum and copper in a weight ratio of from about 70:30 to 30:70, said particles ranging in size from about 0.001 to 0.5 inch with an aqueous solution having dissolved therein from greater than 0 up to about 25 weight percent of at least one material selected from the group consisting of amine bases, ammonia, and alkali metal hydroxide for a time sufficient to remove from said particles at least about 25 weight percent of the aluminum present therein on a total initial particle weight basis, and further contacting such particles simultaneously and/or sequentially during said contacting with an aqueous solution having dissolved therein from greater than 0 up to about 25 weight percent of at least one polyfunctional oxygen-containing aromatic compound, for a time of at least about ½ hour, each said amine base being selected from the group consisting of alkyl amines, alkanol amines, and quaternary ammonium hydroxides, each said polyfunctional oxygen-containing aromatic compound being characterized by
   A. containing per molecule
      1. at least one six membered aromatic nucleus,
      2. at least two oxygen atoms, each such oxygen atom being incorporated into a different radical selected from the class consisting of hydroxyl groups and carboxyl groups,
   3. at least one of said radicals being substituted on said one aromatic nucleus, and
   4. not more than three repeating, condensed units per molecule,
  B. having a solubility in water at a pH greater than 10 to an extent such that about a 5 weight percent solution thereof can be formed at room temperature conditions, and
  C. having a molecular weight of not more than about 1000.

2. The process of claim 1 wherein such particles after such contacting and such further contacting are washed with water for a time at least sufficient to cause said wash water to have a pH not greater than about 9.

3. The process of claim 1 wherein said further contacting takes place simultaneously with said contacting.

4. The process of claim 1 wherein said further contacting takes place simultaneously and following said contacting.

5. The process of claim 1 wherein said further contacting takes place after said contacting.

6. The process of claim 1 wherein the resulting particles are comprised of from about 2 to 45 weight percent aluminum with the balance up to 100 weight percent thereof being copper.

7. The process of claim 1 wherein said solution comprises from greater than 0 to about 15 weight percent of a base selected from the group consisting of hydroxide and said amine bases, from greater than 0 to about 5 weight percent of said polyfunctional oxygen-containing aromatic compounds and with the balance up to 100 weight percent thereof being water, same solution basis.

8. The process of claim 1 wherein said solution comprises from greater than 0 to about 10 weight percent alkali metal hydroxide from about 0.01 to about 1.0 weight percent of said polyfunctional oxygen-containing aromatic compounds and with the balance up to 100 weight percent thereof being water, same solution basis.

9. The process of claim 1 wherein at least about 25 weight percent of the initially present aluminum in said alloy particles is removed during said contacting.

10. The process of claim 1 wherein said contacting is conducted for a time ranging from about ½ to 30 hours.

11. The process of claim 1 wherein before said contacting with said solution said alloy is preliminarily contacted with a preliminary composition which comprises an aqueous solution of at least one said polyfunctional oxygen-containing aromatic compound.

12. The process of claim 11 wherein said preliminary composition comprises from greater than 0 to about 5 weight percent of said additive with the balance up to 100 weight percent on a total composition basis being water.

13. The process of claim 11 wherein said preliminary composition comprises from about 0.01 to 1.0 weight percent of said one material with the balance up to 100 weight percent on a total composition basis being water.

14. The process of claim 1 wherein said Raney copper catalyst is in the form of particles at least 90 weight percent of which range in average size from about 0.002 to 0.100 inch.

15. The process of claim 1 wherein said Raney copper catalyst is in the form of particles at least 90 weight percent of which range in average size from about 0.02 to 0.5 inch.

16. In an improved process for making a Raney copper catalyst, the improvement which comprises the step of activating a Raney copper catalyst through contact of aqueous alkali metal hydroxide with a metal alloy in particulate form and comprised of copper and aluminum thereby to remove from such alloy particles at least about 25 weight of the aluminum initially present therein, at least a portion of such contacting being conducted over a time interval of from ½ to 30 hours using an aqueous alkali metal hydroxide solution which additionally was dissolved therein at least one polyfunctional oxygen-containing aromatic compound, each said polyfunctional oxygen-containing aromatic compound being characterized by
  A. containing per molecule
   1. at least one six membered aromatic nucleus,
   2. at least two oxygen atoms, each such oxygen atom being incorporated into a different radical selected from the class consisting of hydroxyl groups and carboxyl groups,
   3. at least one of said radicals, being substituted on said one aromatic nucleus, and
   4. not more than three repeating, condensed units per molecule,
  B. having a solubility in water at a pH greater than 10 to an extent such that about a 5 weight percent solution thereof can be formed at room temperature conditions, and
  C. having a molecular weight of not more than about 1000.

17. The process of claim 1 wherein said polyfunctional oxygen-containing aromatic compound is gallic acid.

18. The catalyst produced by the process of claim 1.

19. A process for hydrolyzing an olefinic nitrile comprising the steps of
  A. Contacting at a temperature below about 80°C particles of an alloy comprised of aluminum and copper in a weight ratio of from about 70:30 to 30:70, said particles ranging in size from about 0.001 to 0.5 inch, with an aqueous solution having dissolved therein from greater than 0 up to about 25 weight percent of at least one material selected from the group consisting of amine bases, ammonia, and alkali metal hydroxide for a time sufficient to remove from said particles at least about 25 weight percent of the aluminum present therein on a total initial particle weight basis, each said amine base being selected from the group consisting of alkyl amines, alkanol amines, and quaternary ammonium hydroxides,
  B. Further contacting such particles simultaneously and/or sequentially during said contacting with an aqueous solution having dissolved therein from greater than 0 up to about 25 weight percent of at least one polyfunctional oxygen-containing aromatic compound for a time of at least about ½ hour, each said polyfunctional oxygen-containing aromatic compound being characterized by
   1. containing per molecule
    a. at least one six membered aromatic nucleus,
    b. at least two oxygen atoms, each such oxygen atom being incorporated into a different radical selected from the class consisting of hydroxyl groups and carboxyl groups, c. at least one of said radicals, being substituted on said one aromatic nucleus, and
d. not more than three repeating, condensed units per molecule,
2. having a solubility in water at a pH greater than 10 to an extent such that about a 5 weight percent solution thereof can be formed at room temperature conditions, and
3. having a molecular weight of not more than about 1000,
C. Still further contacting the so-washed particles with a composition comprising from about 10 to 75 weight percent acrylonitrile with the remainder up to one hundred weight percent thereof being water at a temperature ranging from about 150 to 300°F for a time sufficient to convert at least some of said olefinic nitrile to the corresponding amide.

20. The process of claim 19 wherein the so-contacted and so further contacted particles before being so still further contacted are washed with water for a time at least sufficient to cause said wash water to have a pH not greater than about 9.

21. In an improved process for hydrolyzing an olefinic nitrile to the corresponding amide, the improvement which comprises using, under liquid phase, elevated temperature conditions a copper catalyst comprised of from about 2 to 45 weight percent aluminum with the balance up to 100 weight percent thereof being copper, said catalyst being in the form of particles ranging in size from about 0.001 to 0.5 inch, said catalyst having been prepared by contacting particles of a metal alloy comprised of copper and aluminum with an aqueous solution which has dissolved therein on a 100 weight percent total by-product free solution basis from greater than 0 to about 25 weight percent of at least one material selected from the group consisting of amine bases, ammonia, and alkali metal hydroxide and from about greater than 0 up to about 25 weight percent of at least one polyfunctional oxygen-containing aromatic compound, said contacting being conducted at a temperature below about 80°C, each said amine base being selected from the group consisting of alkyl amines, alkanol amines, and quaternary ammonium hydroxides, each said polyfunctional oxygen-containing aromatic compound being characterized by A. containing per molecule
   1. at least one six membered aromatic nucleus,
   2. at least two oxygen atoms, each such oxygen atom being incorporated into a different radical selected from the class consisting of hydroxyl groups and carboxyl groups,
   3. at least one of said radicals, being substituted on said one aromatic nucleus, and
   4. not more than three repeating, condensed units per molecule,
B. having a solubility in water at a pH greater than 10 to an extent such that about a 5 weight percent solution thereof can be formed at room temperature conditions, and
C. having a molecular weight of not more than about 1000.

* * * * *